United States Patent
Reber

[15] 3,704,577
[45] Dec. 5, 1972

[54] MECHANISM FOR REGULATING TOOL-CARRIER ARMS ON SPINNER-TYPE AGRICULTURAL MACHINES

[72] Inventor: Walter Reber, Saverne, France
[73] Assignee: Societe Dite: Societe Kuhn Frerest Cie. Societe En Commandite Simple, Saverne, France
[22] Filed: Feb. 27, 1970
[21] Appl. No.: 14,949

[30] Foreign Application Priority Data

March 26, 1968 France..................................6908370
Jan. 26, 1970 France..................................7002568

[52] U.S. Cl. .................................................56/370
[51] Int. Cl. ...........................................A01d 79/00
[58] Field of Search.......................56/370, 376, 377

[56] References Cited

UNITED STATES PATENTS

| 84,257 | 11/1868 | Burt et al. | 56/370 |
| 458,093 | 8/1891 | Boals | 56/370 |
| 784,540 | 3/1905 | Blackstone et al. | 56/370 |

FOREIGN PATENTS OR APPLICATIONS 1,524,069  5/1968  France....................................56/370

Primary Examiner—Louis G. Mancene
Assistant Examiner—J. A. Oliff
Attorney—Ernest G. Montague

[57] ABSTRACT

A mechanism for regulating tool-carrier arms on tedders or swathers or other spinner-type agricultural machines comprising one or more rotary members which act as tool-carrier arms to carry tools such as rotating forks or prongs or teeth. The mechanism is characterized in that some or all of the said arms of one and the same rotary member are connected either directly or through one or more interposed parts with a regulable element rotating with the rotary member during working, the whole being arranged in such manner that to a rotational displacement of this element in relation to the arm-carrier hub there corresponds a rotational displacement upon themselves, in relation to their seatings on the arm-carrier hub, of these some or preferably all of the tool-carrier arms of one and the same rotary member.

4 Claims, 8 Drawing Figures

MECHANISM FOR REGULATING TOOL-CARRIER ARMS ON SPINNER-TYPE AGRICULTURAL MACHINES

INTRODUCTION AND BACKGROUND OF THE INVENTION

The invention relates to a mechanism for regulating tool-carrier arms on agricultural machines, such as tedders, swathers or the like of the kind known as "spinner-type." These so-called spinner-type agricultural machines serve especially or inter alia for tedding or swathing or for tedding and swathing, thus they are composed inter alia of one or more rotary members comprising arms which carry tools such as forks, teeth or the like.

BRIEF SUMMARY OF THE INVENTION

The mechanism is noteworthy especially in that some or preferably all of the tool-carrier arms of one and the same rotary member are connected either directly or through one or more interposed parts to a regulable element rotating with the rotary member during working, the whole being arranged in such manner that to a rotational displacement of this element in relation to the arm-carrier hub there corresponds a rotational displacement upon themselves, in relation to their seatings of the arm-carrier hub, of these some or preferably all of the tool-carrier arms of one and the same rotary member.

FURTHER DESCRIPTION AND ADVANTAGES OF THE INVENTION

As achieved with the aid of the invention, the simultaneous displacement of the whole of the tool-carrier arms permits of making significant improvements at little cost, in agricultural machines of the aforementioned kind.

In fact it permits of rapidly obtaining a very good ground clearance and therefore of filling an important gap in known machines of this kind.

It also permits in certain cases of rapid reduction of the bulk of the machine, facilitating transport and accommodation.

Finally it permits of regulating rapidly, even in one single operation, without any tool and in an extremely precise manner, which is extremely important, the working inclination of all the tools of one and the same rotary member.

BRIEF DESCRIPTION OF THE VIEWS IN THE DRAWINGS

The invention is further explained with reference to the accompanying drawings, in which:

FIG. 1 is a side view of parts of a typical so-called spinner-type agricultural machine, FIG. 2 is a diagram illustrating the functioning of an implement such as a rotary prong or fork, FIG. 3 is a rear view showing tool-carrier arms with implements thereon, FIG. 4 is a view in section on the line B—B in FIG. 5 of a first preferred form of the mechanism according to the invention, FIG. 5 is a view partially in section on the line C—C in FIG. 4, FIG. 6 is a view in section like FIG. 4 but showing a second preferred form of the mechanism, FIG. 7 is a view in section like FIG. 4 but showing a third preferred from of the mechanism, and FIG. 8 is a partial sectional view from above to illustrate how a rotary member may be mounted.

FIG. 1 represents a profile view of one of the numerous machines of the kind to which the present invention relates. It should be noted inter alia that they can comprise one or more rotary members, that they can be trailer-type, semi-mounted, mounted, pushed or others, whether or not equipped with swathing equipment, and the axes of rotation of the rotary members may or may not be inclined in the direction of travel, they can be used separately or in combination with other machines, etc.

In FIG. 1 there may be seen in non-limitative form certain elements which will be discussed in the description, namely the rotary member 25, the frame 2, the tool-carrier arms 7 and the tools 1, in the present case forks.

The work and the ground clearance obtained with this kind of machines depend greatly upon the position of the tools in relation to the ground. In fact, taking by way of example the case where the tool is a fork 1 (FIG. 2), where the arrow A indicates the direction of travel, it is easily understood that if this fork is directed substantially as indicated by 1' in FIG. 2, the fodder will remain attached longer after the fork, will be projected further and will be scattered more than if this fork were oriented substantially as indicated by 1'' in FIG. 2. In the former case, this position of the forks will contribute to obtaining a certain scattering of the fodder and in the latter case it will contribute to a certain swath formation.

In practice the working conditions are very variable and depend upon a certain number of factors, especially upon the degree of humidity of the fodder, its density, the state of the ground and the degree of deformation of the forks.

Thus in order to obtain quality work with good output, in other words to ted and spread suitably without soiling the fodder with earth, without deteriorating it by stripping leaves, thus losses of nutrient parts, in order to rake it well over the whole working area and to form clean swaths, the forks would very often have to be situated somewhere between the positions 1' and 1'', or even beyond these positions, thus they would have to be capable of being regulated in a very precise manner, preferably by means of tool-carrier arms, especially to avoid the necessity of compensating regulation in height or inclination and to utilize elements of low bulk which are difficult to deform. Moreover to obtain good ground clearance "H" it would be necessary to be able to regulate the forks rapidly substantially in accordance with 1''' or 1''''.

Finally on machines having the form arms placed substantially in accordance with FIG. 3 it would be advantageous to be able to regulate the forks rapidly as indicated by 1''''' in order to diminish the bulk E to e, in order to facilitate road transport and storage.

The invention permits of satisfying these needs. Furthermore it is very convenient and not irksome in use and will permit the users of such machines to obtain advantageous time savings during the operations of regulation, especially on machines having a large number of spinners, which moreover have a tendency to become general in present day and future working.

DETAILED DESCRIPTION OF THE PREFERRED EMBODIMENTS

From the accompanying drawings it will appear that the proposed non-limitative solutions are sound mechanical conceptions responding to the true needs.

FIGS. 4 (Section B—B from FIG. 5), 6 and 7 represent partial sections of rotary members.

Figure 1:
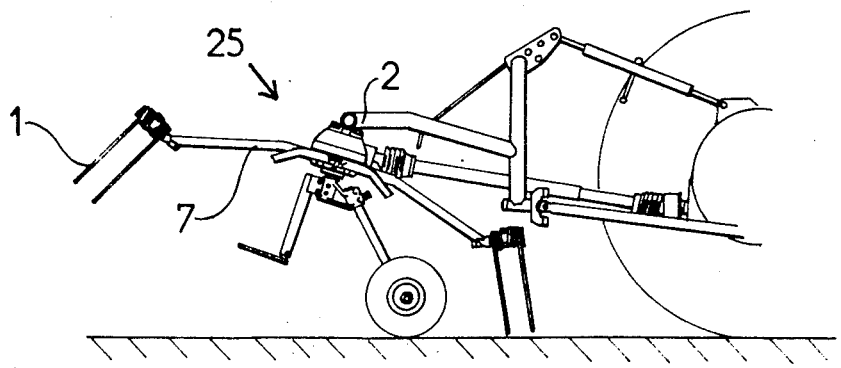
Figure 2:
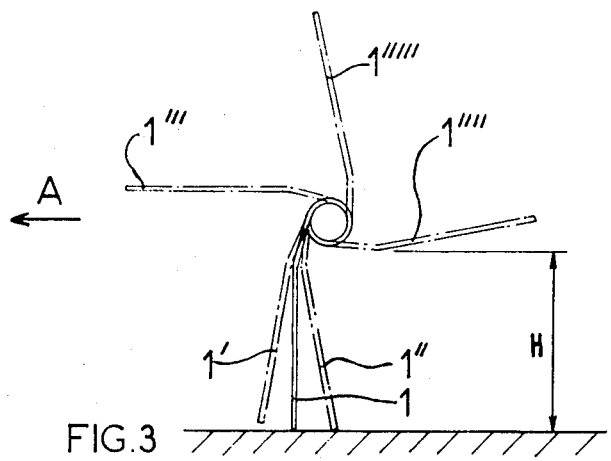
Figure 3:
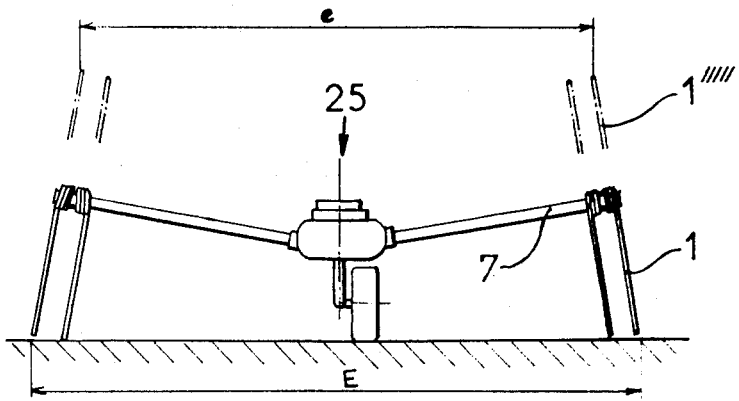
Figure 4:
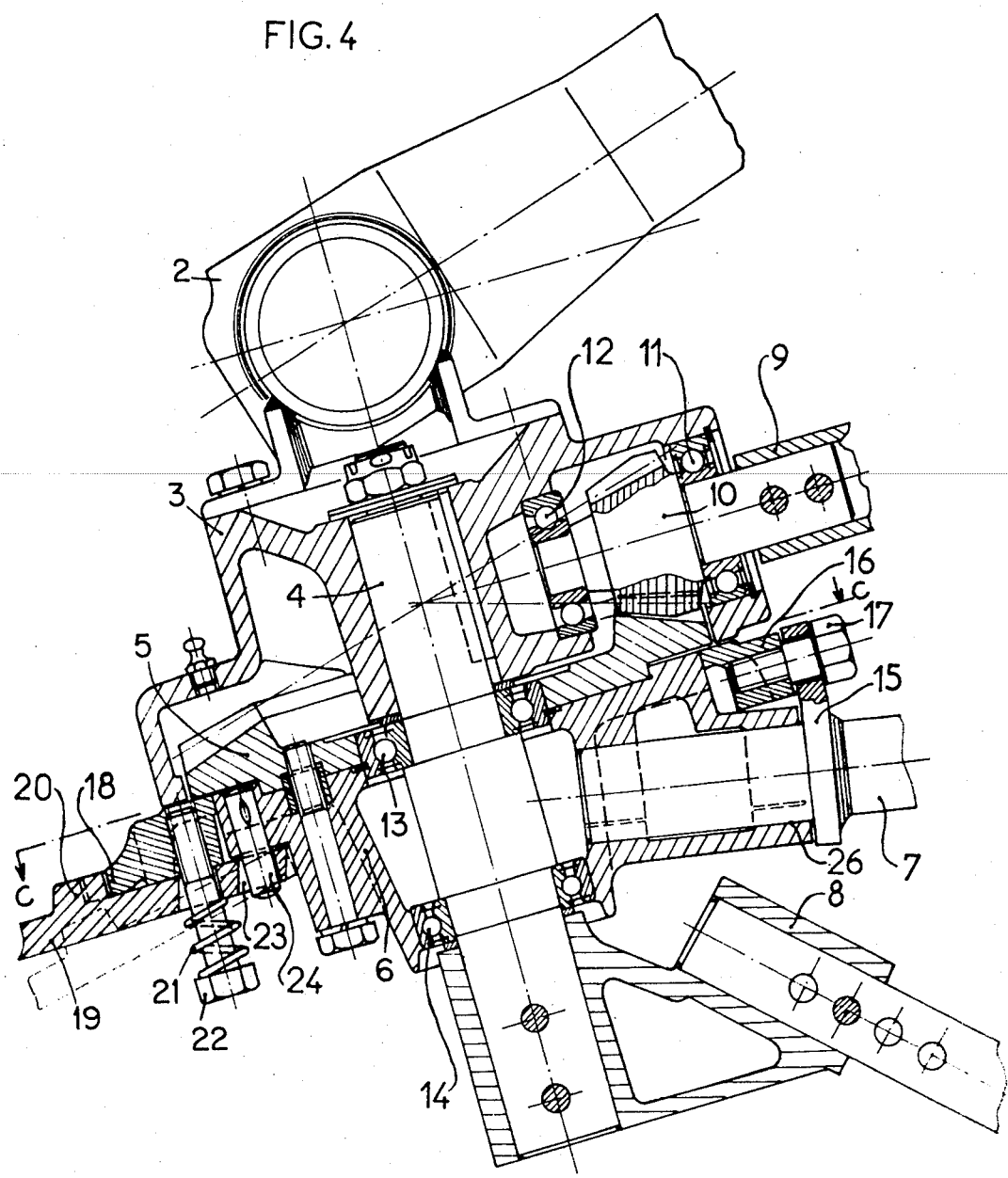
Figure 6:
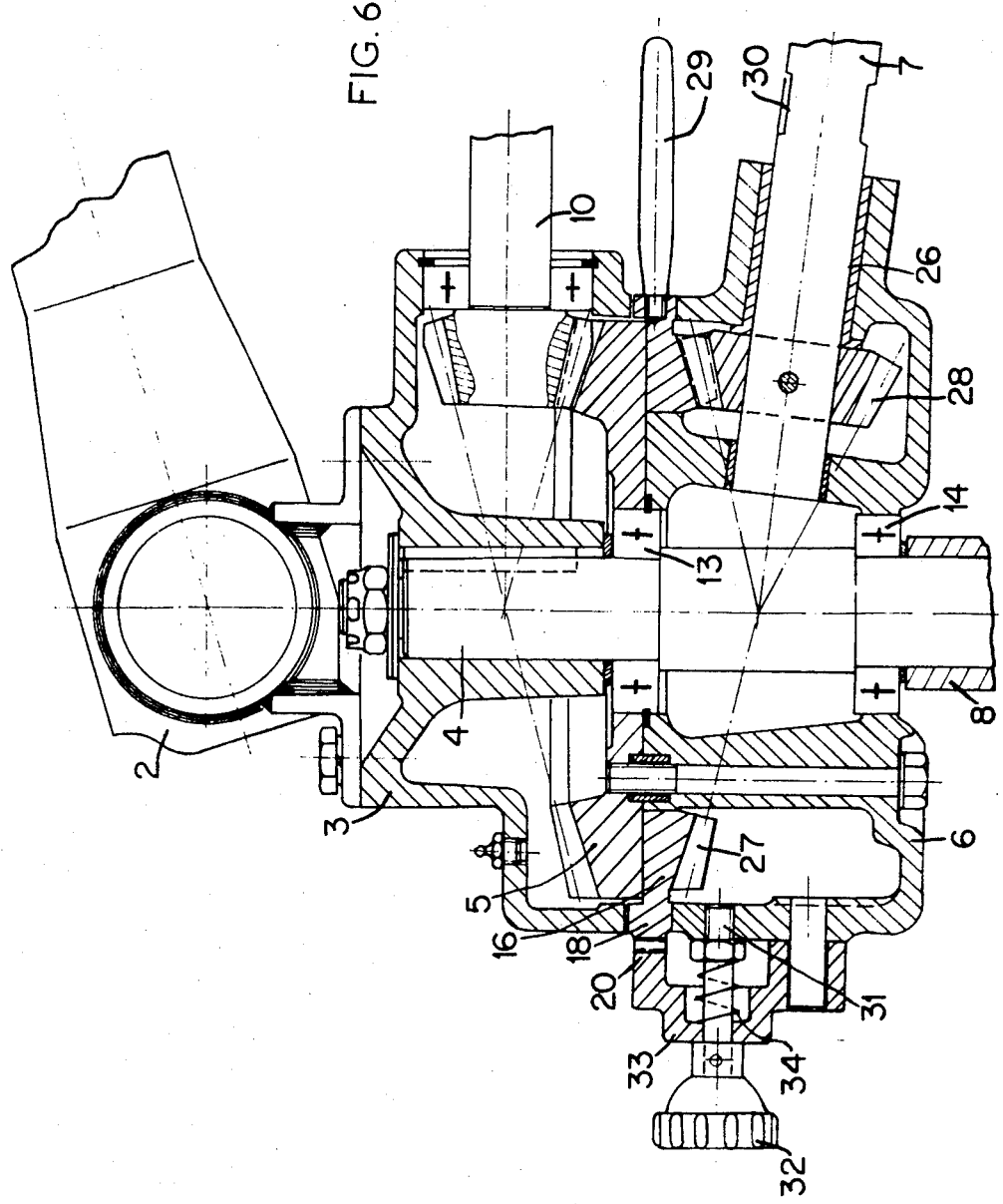
Figure 7:
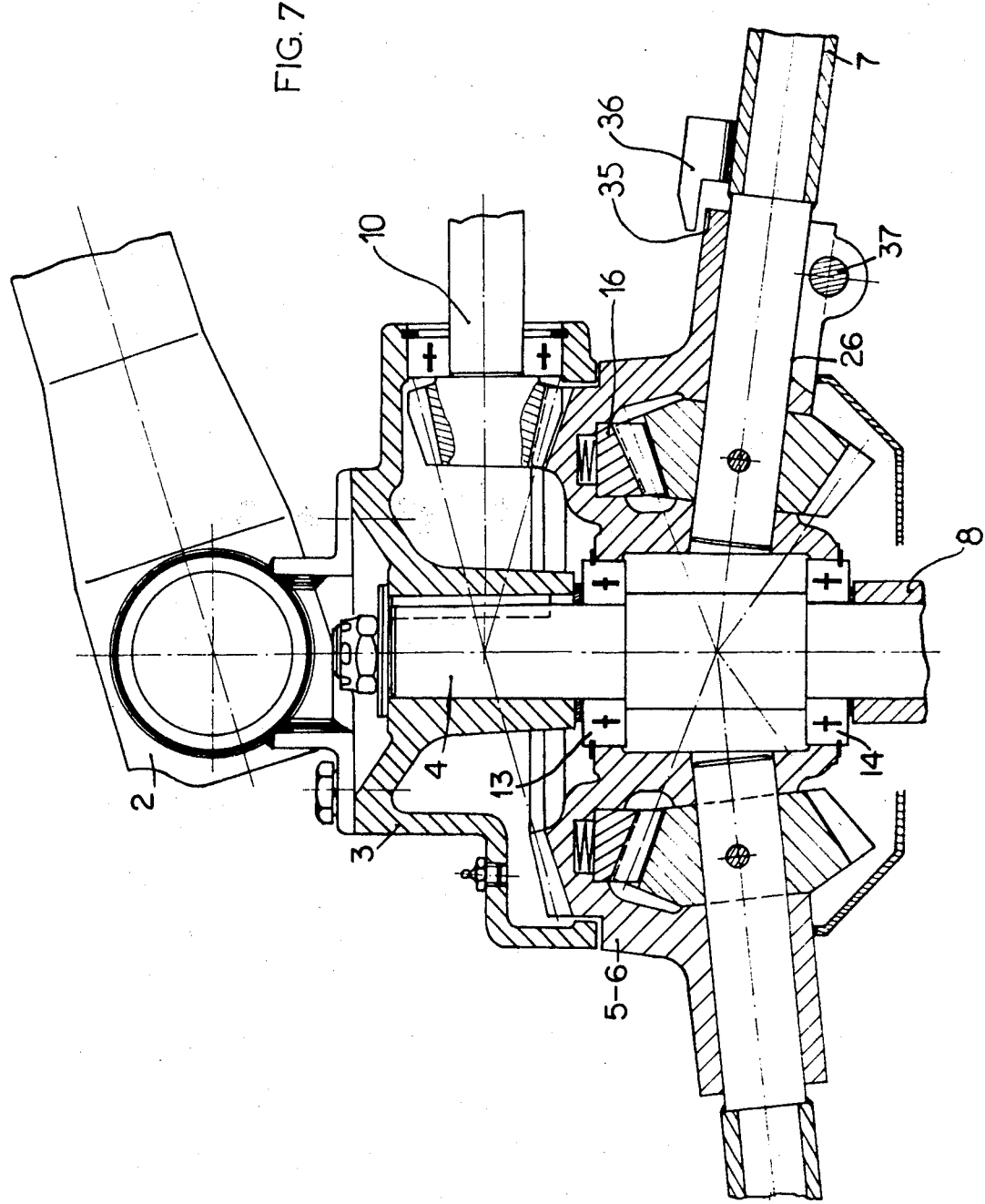

In FIGS. 4, 6 and 7 there are distinguished especially: The frame 2 of the machine, a casing 3 made fast with the frame 2 and serving for the positioning and protection of certain elements while permitting their lubrication, a fixed spindle 4 made fast with the casing 3 and serving for positioning the integrated assembly of toothed crown 5 and hub 6 (which may be constituted by one or more parts) and for positioning a pillar 8 for a wheel.

In the example according to FIGS. 4 and 5 the manner of operation is as follows:

The drive shaft 9 rotates a bevel pinion 10 mounted on ball bearings 11 and 12 which position it in the casing 3. This bevel pinion 10 rotates the integrated assembly of toothed crown 5 and hub 6. This assembly is mounted on bearings 13 and 14 which position it on the shaft 4 fast with the casing 3. Seatings 26 are provided in the hub 6 to receive the tool-carrier arms. These seatings can comprise greasing passages or be provided with self-lubricating rings or other devices to facilitate operation. The fit between the arm 7 and seating 26 is a rotating fit. On each tool-carrier arm 7 there is secured a plate 15 permitting the connection of the arms with a regulable element 16 of ring form. The connection can be effected by a stepped screw 17 screwed into the ring 16.

The ring 16 comprises a toothed segment 18. A directing lever 19 having a toothed part 20 meshing with the toothed part 18 of the ring 16 is applied against the ring by means of a compression spring 21 compressed by a screw 22 screwed into the ring 16.

The lever 19 has a seating 23 into which there penetrates a stop pin 24 made fast with the hub 6. The manner of assembly is especially to permit the lever 19 momentarily to occupy a position as indicated in dotted lines in FIG. 4, so that the toothings 18 and 20 are no longer in engagement, so that movements can take place between the hub 6 and the ring 16 by actuation of the lever 19 to the left or the right in the direction of the arrows G and D (FIG. 5), after it has been pushed downwards as indicated in dotted lines in FIG. 4. In order to effect locking afresh, it is sufficient to release the lever opposite to the desired position. Taking account of this description, it will easily be understood that if a small relative displacement to the left or to the right is caused between the ring 16 and the hub 6, a rotational movement is imparted to the tool-carrier arms 7, thus a variation is made in the position of the tools fixed to these arms by a rotational movement of the plate 15 which is secured to the arms 7 and the ring 16. Thus by depressing the lever 19 until the toothings 18 and 20 are no longer in engagement and by moving the lever to the left or the right before returning the toothings into engagement by release of the lever opposite to the desired position, the working inclination of all the tools of one and the same rotary member is regulated simultaneously without the application of any device and in one single operation.

In the example according to FIG. 6, the regulable element 16 is a crown 16 comprising a toothed part 27 meshing with a toothed part 28, combined or not, of the tool-carrier arms 7. The rotational displacement of this crown 16 can be effected by a lever 29 for example, or indirectly by acting upon a fork arm and/or on a fork. A flat 30 could be provided on a fork arm for this purpose.

To render this rotational displacement of the element 16 in relation to the hub 6 possible, it will be sufficient partially to unscrew the threaded rod 31 fast with the handle 32 until the teeth 20 of the clamp 33 are no longer in engagement with the teeth 18 of the element 16. The compression spring 34 will contribute to ensuring this disengagement. It is self-evident that to make the element 16 fast in rotation again with the hub 6 it will be sufficient to retighten the handle 32.

The teeth 18 of the element 16 can be provided on a part of the periphery of the element 16, or even all round this element. They may be equidistant or not.

Figure 5:
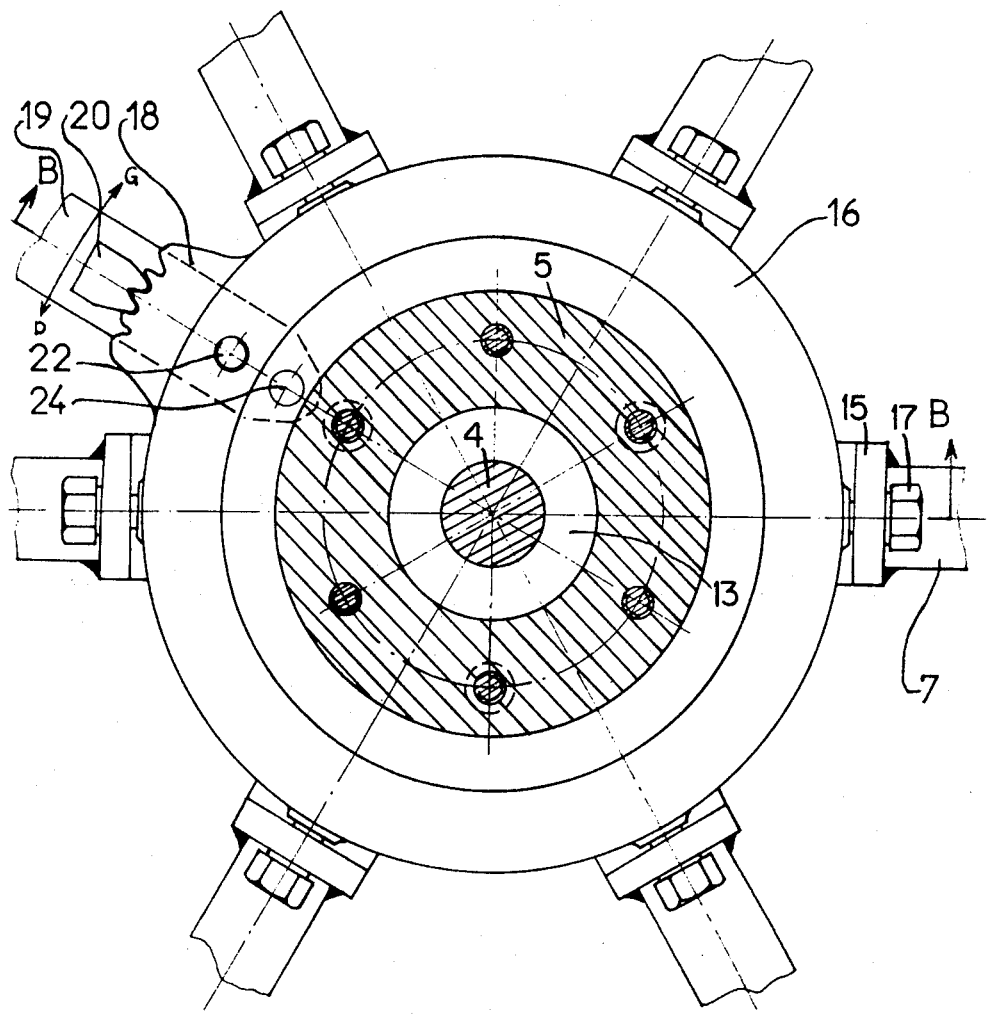
FIG. 5 represents a partial section C—C, seen from above, of FIG. 4.

In comparison with the example in FIGS. 4 and 5, this conception has the advantage of permitting simultaneous rotational displacement upon themselves, in one direction or the other, in relation to their seatings 26, of all of the tool-carrier arms of one and the same rotary member by an angle which can vary from 0° to 360°.

In the example in FIG. 7, the element 16 is a toothed crown. The arm-carrier hub 6 and the drive toothed crown 5 are constituted in one and the same part. The toothed crown 16 and hub 5–6 have a turning fit. Lubrication passages, one or more self-lubricating rings or other lubricating arrangements or one or more bearings and/or stops can be provided in or between these two elements. On each rotary member which the machine may comprise, a tool-carrier arm 7 is connected to the hub 5–6 by gripping or by any other form of connection permitting of making the arm fast in rotation with this hub 5–6 and releasing it rapidly. Thus by rotating this single arm 7 in relation to its seating 26, the toothed crown 16 is rotated and therefore the whole of the tool-carrier arms connected to this crown 16 is rotated.

In comparison with the foregoing examples, this conception has the great advantage of permitting of causing the arms 7 to occupy all angular positions between 0° and 360° in relation to their seatings, and thus of obtaining precise adjustment which is so advantageous in practice. It also has the advantage that the element 16 is lodged in the rotary member and therefore can be lubricated and better protected from dust, entanglement, and even from rain water or washing water.

Reference markers 35–36 can be provided in such manner that on each adjusting action it is easily possible to bring all of the corresponding tool-carrier arms of all of the tool-carrier rotary members into similar positions.

The machines can for example be equipped with a multipurpose spanner permitting of tightening and loosening the screw 37 which effects the locking and unlocking of an arm 7 for each rotary member, and permits of shifting this arm in rotation in relation to the seating 26 for the purpose of the mentioned adjustments.

Figure 8:
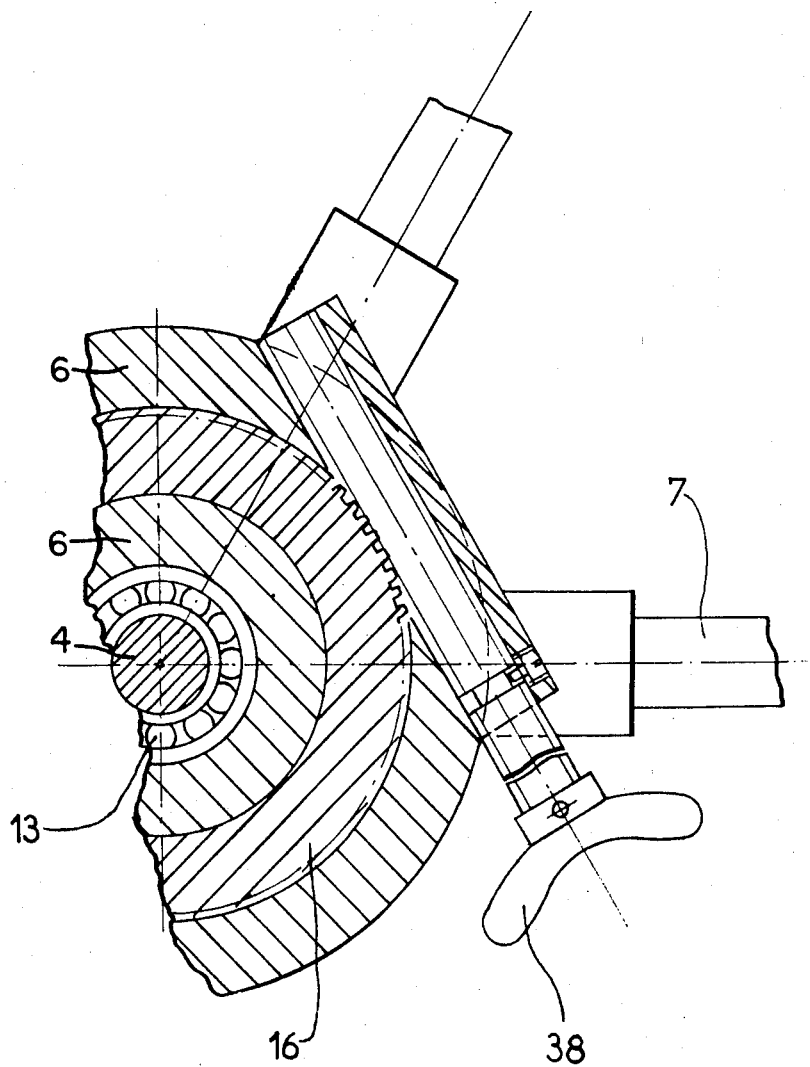
FIG. 8 represents a partial section, seen from above, of a rotary member.

In the example in FIG. 8 the element 16 can be shifted in rotation and locked by means of a screw 38. It should be noted that one, several or all of the tool-carrier arms 7 could moreover be provided with known means permitting of independent and separate adjustment of the position of each tool. One, several or all of these arms could also be foldable, detachable or telescopic, by known means, for the purpose of permitting reduction of the bulk of the machine.

This invention has been described with reference to several particular forms of embodiment thereof. Numerous variants and modifications concerning the general conception and in particular the regulable element, the different connections, the adjusting mechanism of the said regulable element and the utilization can of course be invisaged without thereby departing from the scope of the invention.

What is claimed is:

1. A mechanism for regulating a plurality of radially extending tine carrying arms on rotary rakes, comprising
   at least one rotary member including said plurality of radially extending arms, each of said arms defining an axis radially oriented relative to said rotary member,
   means for displacing each of said arms simultaneously by corresponding angular rotation about the respective axes thereof, and
   means for releasably locking each of said arms in position with respect to said axes.

2. The mechanism, as set forth in claim 1, wherein:
   said displacing means includes a displaceable element operatively connected to said arms and rotatably displaceable relative to and about an axis of rotation of said rotary member and releasable for displacement relative to said rotary member.

3. The mechanism, as set forth in claim 2, wherein
   said arms are provided with gear teeth, and
   said displaceable element is provided with gear teeth engaging said teeth of said arms.

4. The mechanism, as set forth in claim 3, further comprising:
   a single arm means for displacing said displaceable element relative to said rotary member and said releasably locking means for releasably locking said single arm means.

* * * * *

UNITED STATES PATENT OFFICE
CERTIFICATE OF CORRECTION

Patent No. 3,704,577     Dated   December 5, 1972

Inventor(s) WALTER REBER

It is certified that error appears in the above-identified patent and that said Letters Patent are hereby corrected as shown below:

On the cover sheet [73] the name of the assignee should read -- Societe Dite: Societe Kuhn Freres & Cie. Societe En Commandite Simple, --.

Signed and sealed this 15th day of May 1973.

(SEAL)
Attest:

EDWARD M. FLETCHER, JR.
Attesting Officer

ROBERT GOTTSCHALK
Commissioner of Patents